United States Patent [19]

Maisenhälder et al.

[11] 4,156,828
[45] May 29, 1979

[54] GLOW DISCHARGE APPARATUS AND A METHOD OF OPERATING SAME

[75] Inventors: Fritz Maisenhälder, Ostfildern; Richard Jacobson, Sindelfingen; Wilhelm Schrenk, Stuttgart, all of Fed. Rep. of Germany

[73] Assignee: Deutsche Forschungs- und Versuchsanstalt für Luft- und Raumfahrt e.V., Bonn, Fed. Rep. of Germany

[21] Appl. No.: 884,736

[22] Filed: Mar. 9, 1978

[30] Foreign Application Priority Data

Mar. 18, 1977 [DE] Fed. Rep. of Germany ....... 2711827

[51] Int. Cl.$^2$ ...................... H01J 17/26; H01J 61/28; H05H 1/00
[52] U.S. Cl. ................................... 313/210; 313/231.3
[58] Field of Search ............... 313/231.3, 231.4, 231.5, 313/210

[56] References Cited

U.S. PATENT DOCUMENTS

| | | | |
|---|---|---|---|
| 3,029,635 | 4/1962 | Fetz | 313/231.4 X |
| 3,294,953 | 12/1966 | Spies, Jr. | 313/231.4 X |
| 3,448,333 | 6/1969 | Arkless et al. | 313/231.3 X |

*Primary Examiner*—Palmer C. Demeo
*Attorney, Agent, or Firm*—Lawrence E. Laubscher

[57] ABSTRACT

A glow discharge apparatus consists of a discharge tube with an anode at one end and a cathode at the other end. The anode has a flat surface facing the end of the discharge tube, and gas enters the tube via an annular gap formed between the flat anode surface and the end of the tube. The gas flowing in is thus directed initially radially over the anode surface and helps to cool at this surface. It is advantageous if the anode is able to move axially to alter the width of the annular gap. The gas can flow into the annular gap at the speed of sound.

6 Claims, 1 Drawing Figure

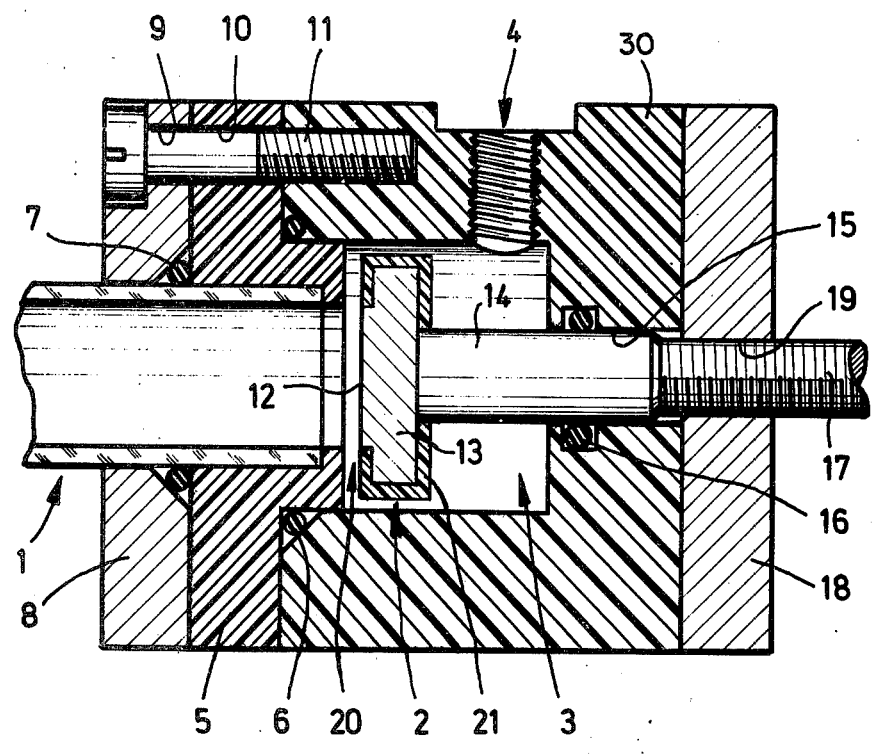

GLOW DISCHARGE APPARATUS AND A METHOD OF OPERATING SAME

FIELD OF THE INVENTION

The invention relates to a method of producing and maintaining a glow discharge which burns between an anode and a cathode in a flowing gas, and more specifically to controlling the gas flow over the anode surface, wherein the gas is introduced radially at a high flow speed into the gas discharge vessel. The invention also relates to apparatus for performing this method.

BACKGROUND OF THE INVENTION

Such glow discharges may be employed, for example, in order to obtain continuous lasers of high power density. For example, such a gas-dynamic CO-laser is known, wherein the gas travelling through the glow path between anode and cathode is subsequently cooled to very low temperatures, whereby the inversion necessary for a laser effect is obtained. In order to increase the output density of such lasers; it is a condition that the power density in the glow discharge is as high as possible for exciting the gas.

Heretofore, a tubular anode was used in similar glow discharges burning in gas streams, wherein the gas was introduced into the discharge tube proper either through the anode tube itself or through radial slots in front of the anode tube. By means of such arrangements power densities of up to approximately 50 W/cm$^3$ could be obtained. The literature cited below represents the present state of the art.

- I. W. Rich, R. C. Bergmann, J. A. Lordi, Electrically excited, supersonic flow carbon monoxide laser, AIAA J., Vol. 13. No. 1, Jan. 1975.
- H. Brunet, M. Mabru, Improved performance of an electric-discharge N$_2$-CO mixing laser, J. of Appl. Physics, Vol. 46, No. 7, July 1975.
- W. L. Nighan, Stability of high power molecular laser discharges, United technologies Res. Center, Rep. 75-19.
- J. W. Daiber, H. M. Thompson, Th. J. Falk, The efficiency of CO vibrational excitation in a self-sustained CW glow discharge, IEEE J. of quantum electronics, Vol. 12, No. 11, 1976.

However, it has been found in the operation of a glow discharge by the methods known heretofore that limits are set to an increase of the power density by the fact that the glow discharge changes into an arc discharge. This change-over expresses itself first in a number of filamentary arc discharges which start from certain locations of the anode. In order to prevent such local arc discharges as far as possible, for example the width of a radial inlet gap for the flowing gas has been maintained with the highest precision heretofore (see the paper by Daiber et.al. referred to above, in the periodical IEEE J. of quantum electronics, of Nov. 11, 1976). However, even these measures could not lead to an increase of the power density exceeding the value stated above.

SUMMARY OF THE INVENTION

The present invention is based on the discovery that local heating effects at the anode are responsible for the creation of the arc discharges, that is to say thermal instability effects, and that the power density of such a glow discharge can be increased considerably upon removal of these thermal instabilities or inhomogeneities.

Thus the invention is based on the problem of increasing clearly the power density of a glow discharge in comparison with glow discharges known heretofore, by seeking to avoid the creation of thermal instabilities, i.e., local overheating effects, in the region of the anode.

This problem is solved according to the invention by a method of the kind described above, in that the anode used is a substantially flat anode the operative surface of which is arranged substantially perpendicular to the discharge axis, and that the gas is introduced into the gas discharge vessel in such a manner that it flows past the flat operative surface of the anode.

Preferably the gas is arranged to flow in at the speed of sound.

The particular geometric arrangement of the anode in the discharge vessel and the gas flowing past its operative surface, i.e. the surface thereof which is active for the glow discharge, lead to a very effective cooling at the anode surface, the radial introduction of the gas and the ensuing whirling thereof in the space in front of the operative anode surface further assisting the cooling.

This effect becomes operative to an increasing degree with the increasing flow speed of the gas introduced, for which reason the gas is arranged to flow in preferably at the speed of sound.

In apparatus for performing the method having a gas discharge vessel which is traversed by a gas stream and which contains an anode and a cathode, and which has an annular gap through which the gas enters into the discharge vessel, the problem is solved in that the anode comprises a substantially flat operative surface for the glow discharge arranged to extend perpendicular to the discharge axis, and is so arranged that the gas which flows in radially flows along this operative surface.

The width of the annular gap is preferably adjustable; thereby the flow speed at which the gas flows past the operative surface may be adjusted.

In a preferred constructional form of the invention it is provided that the anode is disposed in an ante-chamber which is in communication with the discharge tube proper through the annular gap and which comprises an inlet for the gas flowing in. Advantageously the anode may be displaceable relative to the end face of the ante-chamber facing the discharge tube, for the purpose of adjusting the width of the annular gap.

DESCRIPTION OF THE DRAWING AND THE PREFERRED EMBODIMENT

The following description of a preferred constructional form of the invention in conjunction with the drawing serves for more detailed explanation. The single FIGURE of drawing illustrates a diagrammatic longitudinal sectional view of the anode space of a glow discharge according to the invention.

DETAILED DESCRIPTION

The glow discharge is performed in a discharge vessel of usual construction which comprises substantially a discharge tube 1 of circular cross-section as well as a cathode (not shown) and an anode 2. The FIGURE of drawing illustrates only the anode-facing end of the discharge vessel in longitudinal section; at the cathode end the discharge vessel may terminate in a manner known per se in an expansion space in which the gas is sufficiently cooled by expansion in order to attain an inversion sufficient for a laser effect. However, the invention does not relate solely to such glow discharges for gas lasers, but generally to glow discharges for the most varied fields of application.

The discharge tube 1 is open at the anode facing end and communicates with one end of an ante-chamber 3 which is connectable through an inlet 4 contained in the chamber side wall to a source (not shown) of the operating gas. The ante-chamber itself 3 is formed by the inner space of a pot-like construction component of an insulating synthetic resin material which is sealingly fixed to the anode-facing end of the discharge tube 1. For this purpose a flange ring 5 which consists likewise of a synthetic resin material is placed around the anode-facing end of the discharge tube 1 and is sealed relatively to the ante-chamber construction component by means of a ring seal 6. A further holder ring 8 of aluminium is provided on the side located opposite the ante-chamber construction component and surrounds the discharge tube 1, lying sealingly against the flange ring 5 by means of a further ring seal 7. The rings 5 and 8, which form a sealing packing, comprise bores 9 and 10, respectively, through which a screw 11 extends which may be screwed into the ante-chamber housing 30 and which clamps together the rings 5 and 8 as well as the ante-chamber construction component.

In the interior of the ante-chamber 3 the anode is disposed centrally in relation to the discharge tube 1 in such a manner that its operative surface 12, i.e., its surface which is active for the flow discharge, is disposed perpendicular to the longitudinal axis of the discharge tube. The anode itself consists substantially of a disc 13 of circular cross-section and a plunger 14 connected thereto which passes through the ante-chamber wall through an opening 15 and which is sealed against the ante-chamber wall by means of a ring seal 16. At its free end 17 the plunger 14 has an external screw thread which is screwed into a disc 18 disposed against the ante-chamber wall on the side lying opposite the ante chamber 3. The disc 18 consists preferably of aluminium and serves at the same time as current supply means for the anode.

The axial spacing of the anode 2 from the discharge tube 1 may be adjusted by rotating the plunger 14 and thus the anode 2 relatively to the disc 18. Thereby an annular gap 20 is formed between the anode 2 on the one hand and the anode-facing end face of the discharge tube or the flange ring 5 on the other hand, the width of the gap being adjustable by rotation of the anode 1 and the plunger 14.

The disc 13 of the anode is provided with an electrically insulating coating 21 in the regions which are not to serve as active surface of the glow discharge, that is to say not as operative surface. This coating may alternatively be deposited additionally on the surface of the plunger 14, but this is not illustrated in the drawing.

In operation, the operating gas is led through the inlet 4 into the ante-chamber 3 and travels at high speed through the annular gap 20 into the discharge tube 1. The gas stream passing through the annular gap 20 flows closely past the operative surface 12 and is subjected to strong whirling in the region of this operative surface. The operative surface 12 is effectively cooled thereby, local overheating effects and thus the formation of arc discharges being avoided.

This cooling increases with increasing flow speed of the gas. Therefore one endeavours to make the flow speed as high as possible by reducing the annular gap 20. Preferably, the gas is arranged to flow in at the speed of sound.

By increasing the gas pressure in the ante-chamber 3, i.e., thus by supplying the operating gas at an increased pressure, the gas stream travelling through the annular gap 20 may maintain its original direction even after passage through the annular gap 20, i.e., it continues to move along the operative surface 12 before it is diverted in the direction of the discharge tube 1 after whirling. Therefore the flow conditions in the region of the operative surface 12 can be influenced by the choice of the overpressure in the ante-chamber 3. This applies in particular even if the overpressure in the anti-chamber 3 has been selected so high relatively to the discharge tube 1 that in any case the gas flows at the speed of sound through the annular gap 20.

In the illustrated example, the operative surface is of flat construction; however, alternatively it may have a slight curvature.

We claim:

1. The method for producing a glow discharge in a discharge tube connected at one end with a cathode, which comprises the steps of
   (a) connecting a housing with the other end of said discharge tube, said housing containing a chamber in direct communication with said discharge tube;
   (b) arranging in said chamber in axially spaced relation to said discharge tube an anode having a substantially planar operative face directly opposite said discharge tube and extending normal to the axis thereof;
   (c) applying a potential difference across said anode and cathode to initiate a glow discharge from said anode into said discharge tube; and
   (d) directing gas radially inwardly across said anode planar face and axially inwardly into the discharge tube, thereby to avoid the production of thermal instabilities by the local overheating effects in the region of the anode, and to prevent the formation of arc discharges.

2. The method defined in claim 1, wherein the gas travels radially inwardly across the face of said anode at substantially the speed of sound.

3. Glow discharge apparatus, comprising
   (a) a discharge tube (1) adapted for connection at one end with a cathode;
   (b) a housing (30) connected at one end with said discharge tube, said housing containing a chamber (3) in direct communication at one end with the other end of said discharge tube;
   (c) an anode arranged in said chamber, said anode having a substantially planar face (12) directly opposite and facing said one discharge tube end, the operative surface of said anode being normal to the axis of said discharge tube, thereby to define an annular gap (20) between the said one end of said tube and said planar face; and
   (d) means for introducing gas into said chamber in a direction producing flow of the gas radially inwardly across the face of the anode and axially into said tube, whereby when a potential is applied between the anode and cathode to establish a glow discharge from the anode into the tube, the production of thermal instabilities by the local overheating effects in the region of the anode is avoided and to prevent the formation of arc discharges.

4. Apparatus as defined in claim 3, and further including means for axially displacing said anode in said chamber, thereby to vary the width of said annular gap.

5. Apparatus as defined in claim 4, wherein said gas introducing means comprises a gas inlet (4) arranged in a side wall of the chamber between said anode and the end wall at the other end of said chamber, said gas inlet supplying gas at about the speed of sound for producing a strong whirling action of the gas against the operative planar face of said anode.

6. Apparatus as defined in claim 5, and further including a layer of insulating material (21) coating the exposed surfaces of said anode other than said planar operative surface.

* * * * *